United States Patent [19]

Teodorescu et al.

[11] Patent Number: 4,619,146

[45] Date of Patent: Oct. 28, 1986

[54] FLOW METER

[75] Inventors: Tonel E. Teodorescu, Rego Park, N.Y.; William Banko, 1496 Mayflower Ave., Bronx, N.Y. 10461

[73] Assignees: William Banko, Bronx; Henry E. Allen, Mamaroneck; Morris H. Shamos, Bronx, all of N.Y.

[21] Appl. No.: 266,622

[22] Filed: May 22, 1981

[51] Int. Cl.[4] ............................................. G01F 1/24
[52] U.S. Cl. ............................. 73/861.54; 73/DIG. 3
[58] Field of Search ........... 73/861.47, 861.48, 862.52, 73/861.53, 861.54, 861.55, 861.56, 861.71, DIG. 3, 861.58; 324/209; 338/32 H

[56] References Cited

U.S. PATENT DOCUMENTS

| 1,234,774 | 7/1917 | Kocourek | 73/861.54 |
|---|---|---|---|
| 2,052,022 | 8/1936 | Fisher | 73/861.54 |
| 3,128,625 | 4/1964 | Heineman | 73/861.56 |
| 3,224,270 | 12/1965 | Karol et al. | 73/862.56 |
| 4,077,262 | 3/1978 | Cholet | 73/DIG. 3 |
| 4,107,604 | 8/1978 | Bernier | 73/DIG. 3 |
| 4,297,899 | 11/1981 | Blaney et al. | 73/861.58 |
| 4,304,136 | 12/1981 | McCabe et al. | 73/861.54 |
| 4,343,180 | 8/1982 | Herden et al. | 73/DIG. 3 |

FOREIGN PATENT DOCUMENTS

| 1121343 | 1/1962 | Fed. Rep. of Germany | 73/717 |
|---|---|---|---|
| 2241095 | 3/1974 | Fed. Rep. of Germany | 73/861.74 |
| 2368699 | 6/1978 | France | 73/861.53 |

Primary Examiner—Charles A. Ruehl
Attorney, Agent, or Firm—Finnegan, Henderson, Farabow, Garrett & Dunner

[57] ABSTRACT

A flow meter includes a piston having magnetic properties. The piston is located in a cylinder having an outlet slot. Fluid flow into the cylinder and out through the slot determines the position of the piston. The piston is preferably of a magnetic material which interacts with a Hall effect type transducer to produce an output voltage related to the position of the piston and, therefore, to the flow.

15 Claims, 6 Drawing Figures

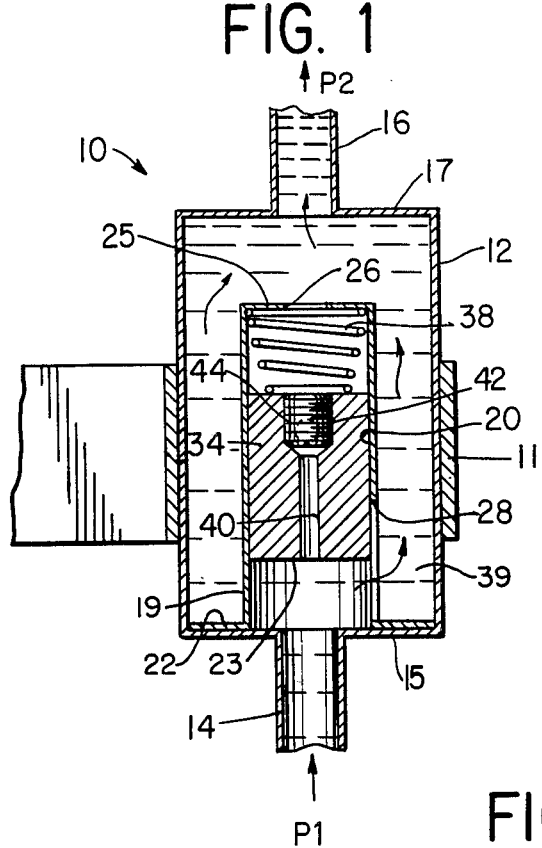
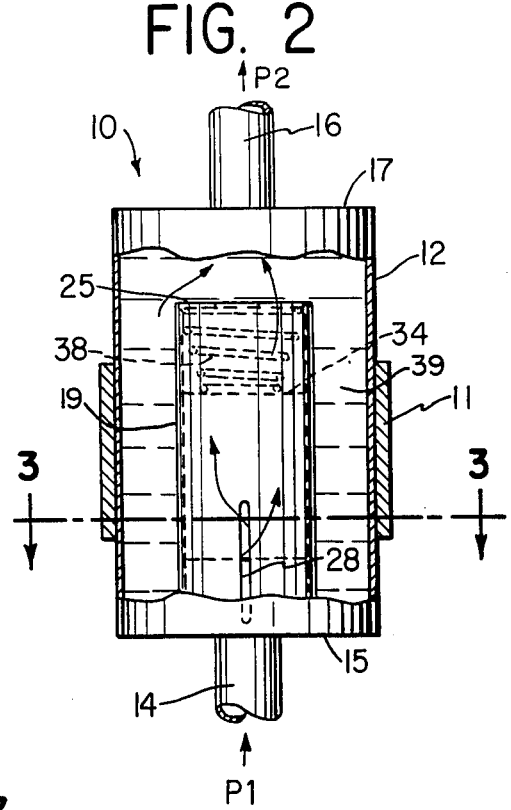
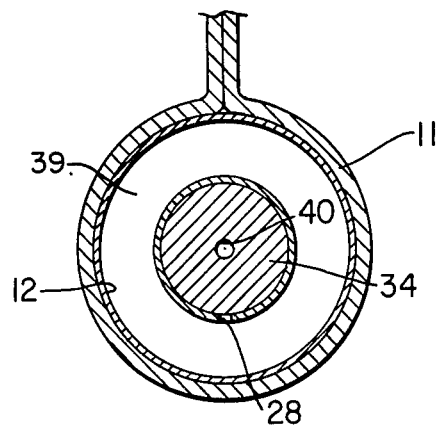

FLOW METER

BACKGROUND OF THE INVENTION

Many applications exist for meters to measure the flow of fluids of various types. The present invention relates to a flow meter of simplified construction in which a piston is responsive to the fluid flow to change its displacement. Movement of the piston produces a variable electric signal which is used as a measurement of the flow.

SUMMARY OF THE INVENTION

In accordance with the invention, the piston is of a magnetic material and cooperates with a transducer which produces a signal corresponding to the piston displacement. In a preferred embodiment, the transducer is of the Hall effect type. Such a transducer is relatively easy to mount and produces a signal which can, if necessary, be linearized or otherwise modified by further electronic circuitry.

It is therefore an object of the present invention to provide a novel fluid flow meter.

An additional object is to provide a flow meter of the moving piston type in which the piston displacement is measured by an electrical sensor and produces a variable electrical signal.

Another object is to provide a flow meter in which the pressure difference between the inlet and outlet is maintained substantially constant and the fluid flow is measured as a function of piston displacement.

Still a further object is to provide a fluid flow meter in which a magnetic piston is displaced in accordance with the flow and the displacement of the piston is measured by a Hall effect transducer.

Other objects and advantages of the present invention will become more apparent upon reference to the following specification and annexed drawings in which:

BRIEF DESCRIPTION OF THE DRAWINGS

FIG. 1 is a longitudinal view, in section, of the flow meter in accordance with one embodiment of the present invention;

FIG. 2 is an elevational view of the flow meter turned by 90°;

FIG. 3 is a top view of the flow meter of FIGS. 1 and 2 along lines 3—3 of FIG. 2;

DETAILED DESCRIPTION OF PREFERRED EMBODIMENTS

Figure 4:
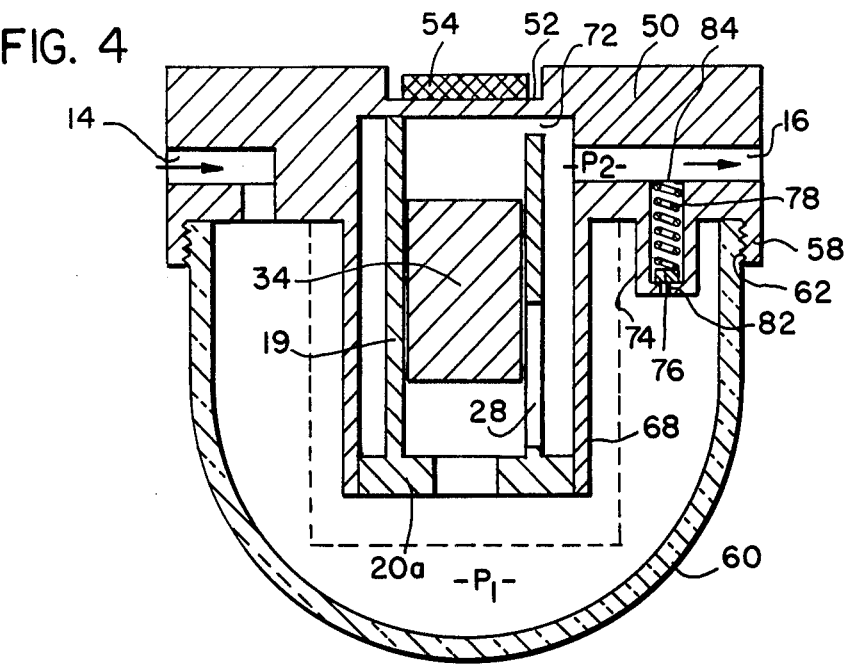
FIG. 4 is an elevational view, partly in section, of a second embodiment of the invention.

Referring to the FIGS. 1-3, the fluid flowmeter generally indicated by reference numeral 10 has an outer housing 12 which can be generally cylindrical or of any other suitable shape. The housing 12 has an inlet 14 at its lower end 15 and an outlet 16 at its upper end 17. Housing 12 can be of any suitable material, for example, metal, plastic, etc. The housing should be resistant to corrosion and deterioration by the particular type of fluid whose flow is to be measured.

Located within the housing 12 in communication with the inlet 14 is a cylinder 19 bounding a cylindrical chamber 20. The bottom end 22 of cylinder 19 is fixedly mounted to the bottom wall 15 of housing 12. Cylinder 19 has a top surface 25 with an opening 26 therein. A throughgoing longitudinal slot 28 is formed in a portion of the length of cylinder 19. The slot 28 can either be continuous or can be a number of slot segments separated by gaps.

A piston 34 fits within the cylinder 19. The clearance between the walls of the piston 34 and cylinder 19 is not important, for reasons given below, and some leakage is permissible. The fact that precision clearances are not required greatly reduces the cost of the flow meter. Piston 34 is of a suitable material which is also resistant to corrosion and deterioration by the particular fluid whose flow is to be measured. Piston 34 preferably has magnetic properties. Therefore, it can be made of a composite magnetic material, such as ferrite or can be of a metallic material which is suitably magnetized.

Fixed to the top wall 25 of the cylinder 19 is a spiral spring 38. Spring 38 maintains a constant downward force on the piston 34. The base end of the spring 38 is attached to the upper wall 25 and the apex end (lower end) presses against piston 34 but is not attached thereto.

The piston 34 also has a vertical throughgoing bore 40 which opens into a chamber 42, the top of which is fitted with a check valve 44. As to be described below, the purpose of the bore 40, chamber 42 and check valve 44 is to insure fluid flow even if something goes wrong with the flow measuring aspects of the meter.

The embodiment of FIGS. 1-3 is preferably vertically mounted so that the piston 34 will exert a more or less constant downward force. If the meter 10 could be maintained in an exactly vertical position, then the spring 38 would not be needed. Alternatively, if the force exerted by spring 38 were much greater than the weight of piston 34, the orientation of meter 10 would become unimportant.

The fluid enters the inlet conduit 14 at pressure $P_1$. Thereafter, the fluid flows into the chamber 20 and presses against the lower surface 23 of the piston 34. Next, the fluid will be constricted to flow through slot 28 and will undergo a drop in pressure as a result. The fluid flowing through the slot 28 thereafter enters the main chamber 39 between the housing 12 and the cylinder 19, and exits through the outlet 16 at a pressure $P_2$. The piston 34 will be raised or lowered depending on the magnitude and direction of the quantity $(P_1-P_2)$, causing more or less of the longitudinal slot 28 to be uncovered, and thereby changing the pressure drop caused by the longitudinal slot 28.

The slot 28 is dimensioned such that sufficient fluid can flow through meter 10 to satisfy the needs of the device in which meter 10 is mounted. For example, if the meter 10 is used in conjunction with an automobile and gasoline flow is being measured, then the slot 28 has an area such that the fuel needs of the automobile will be satisfied.

Figure 5:
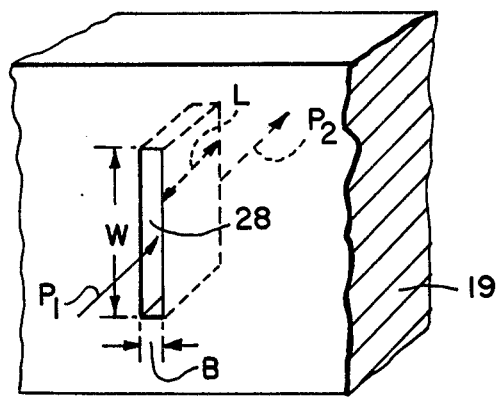
FIG. 5 is a view of the slot in the cylinder showing the dimensions of the slot and the pressure differential in the fluid which is induced thereby.

The displacement of the piston 34 is a reasonably good approximation of the fluid flow. To explain the operation of the flowmeter, consider the following theoretical hydraulic calculation for equilibrium of the piston in connection with FIG. 5:

When the piston 34 is stationary, the sum of the forces acting upon it must cancel out to zero. Where:

$P_1$ is the inlet pressure;

$P_2$ is the outlet pressure;

$A_p$ is the area of the piston 34;
$F_{pl}$ is the force exerted by the fluid to urge the piston upwardly and equals $P_1 \times A_p$;
$F_g$ is the weight of the piston which urges the piston downwardly;
$F_S$ is the force exerted by spring 38 which urges the piston downwardly;
$F_{p2}$ is the force exerted by the fluid to urge the piston 34 downwardly and equals $P_2 \times A_p$;
a stationary piston requires that $$F_{pl} - F_g - F_s - F_{p2} = 0,$$

so that, by substitution $$(P_1 - P_2) A_p = F_g + F_s$$

Hence, the difference in fluid pressure between inlet 14 and outlet 16 will exactly counterbalance the sum of the weight of piston 34 and the force exerted by spring 38.

It is known that if end effects are neglected, the flow rate Q will satisfy the equation $$Q = \frac{(P_1 - P_2)B^3 W}{12 \mu L} \quad (1)$$

Where
B = the width of the slot 28
W = the height of the slot 28
L = the thickness of the slot 28
$\mu$ = the viscosity of the fluid flowing through the slot 28.

$$\text{Since } (P_1 - P_2) = \frac{F_g + F_S}{A_p} \quad (2)$$

substitution yields $$\frac{12 \mu L Q}{B^3 W} = \frac{F_g + F_S}{A_p} \text{ or} \quad (3)$$

$$Q = \frac{B^3}{(12 A_p \mu L)} (F_S + F_S) W \quad (4)$$

The dimensions B and L of slot 28 are constant. W decreases and increases as the piston 34 respectively covers and uncovers a part of slot 28.

$\mu$, the viscosity of the fluid, will likewise be constant for a given fluid. Thus, $Q = K (F_g + F_S) W$ where K is a constant
Four cases then arise:

CASE 1—FLOWMETER IS VERTICAL

A spring is not required, so $F_s = 0$. $(P_1 + P_2)$ remains constant for a static piston 34. All the terms on the right hand side of equation (4) are constant except for W, so that $$Q = K_1 W \quad (5)$$

CASE 2—SPRING 38 EXERTS A CONSTANT FORCE

In this case, the terms on the right-hand side of equation (4) have a different product but are likewise constant (saving only W) for a static piston 34. Thus, $$Q = K_2 W \quad (6)$$

CASE 3—SPRING 38 IS LINEAR AND EXERTS A VARYING FORCE WHICH IS ALWAYS MUCH GREATER THAN THE WEIGHT OF THE PISTON 34

Here, $F_S$ will vary linearly as a function of displacement of the piston 34 and hence linearly as a function of W. $F_g$ can be neglected. Thus, $$Q = K_3 W^2 \quad (7)$$

CASE 4—SPRING 38 IS LINEAR AND THE WEIGHT OF PISTON 34 IS SIGNIFICANT

Here, the effect of the spring must be added as a constant term, so that $$Q = K(F_g + F_S)W$$

$$Q = K F_g + K_3 W^2 \quad (8)$$

In cases 1 and 2, there is a linear relationship between the flow rate and the uncovered length of slot 28. In cases 3 and 4, this relationship is quadratic. In the latter two cases, the relationship can be linearized either by (a) using a non-linear slot or (b) using an electronic sensor to monitor the development of piston 34 and linearizing the output of the sensor electronically. This latter method is discussed below.

In the above analysis, variations in fluid viscosity $\mu$, frictional force on the piston 34 and fluid flow between piston 34 and cylinder 19 have all been neglected.

To compensate for the difference in fluid viscosity caused by temperature changes, a temperature transducer can be used which will correct the flow reading. This is especially important for diesel fuel.

There does exist wall leakage which does not pass through slot 28 but rather leaks up the wall of the piston 34. This wall leakage is relatively small and constant, and causes a pressure drop which is likewise small and constant. The effects of this pressure drop can be compensated for by raising the slot slightly higher on the cylinder 19. The loss can also be compensated by an electrical offset signal. This method of compensation permits a relatively large clearance between the piston 34 and cylinder 19, reducing friction on piston 34.

On the top surface 25 of the cylinder 19, there is a small opening 26 for transmitting the pressure $P_2$ to the upper surface 35 of the piston 34. This opening 26 is made relatively small to prevent rapid movement of the piston 34 during flow rate changes. This causes the piston 34 to move slowly during flow surges and to act as a damper over a slightly longer time interval. The upper surface 25 of the cylinder 19 therefore acts as a shock absorber for the piston 26 due to the small opening 26. Thus, as the flow changes rapidly, piston movement will not follow with flow changes exactly, but will be somewhat damped.

This preferred embodiment acts as a one way valve for fluid flowing through it. Should $P_2$ exceed $P_1$, thereby urging fluid to flow in the reverse direction, piston 34 will move downwardly and will close off slot 28. An O-ring is placed on the bottom wall 15 of the housing 12 and surrounds inlet 14, where O-ring 13 will be contacted by the lower surface 23 of the piston 34 when piston 34 reaches the lower limit of its displacement. This will shut off fluid flow entirely when $P_2$ exceeds $P_1$.

Check valve 44 may be a spring-loaded ball valve or like element. Normally, the meter 10 will function properly. Only when piston 34 is stuck in a position in which fluid flow is unduly restricted should the check valve 44 come into play. Therefore, check valve 44 only allows fluid to pass when $(P_1-P_2)$ is excessive.

It has been established that flow is proportional to piston movement, which is in turn proportional to the uncovered area of slot 28. A suitable positional transducer can be used to detect movement of the piston 34. For example, the piston can change the inductance of a coil 47 which encircles the cylinder 19. Preferably, the piston 34 is magnetic or contains a magnet, and a magnetic field sensor or sensors are located near the cylinder 19, as in the embodiment shown in FIG. 4.

FIG. 4 shows a second embodiment of the invention in which like reference numbers indicate parts which are similar to those shown in FIGS. 1–3. The embodiment of FIG. 4 operates on the same principle as that of FIGS. 1–3 but the parts are arranged somewhat differently to facilitate use and simplify construction. Here, a base 50 (which can be a casting) has a recess 52 in its upper surface, in which recess 52 a Hall effect transducer 54 is located. A Hall effect transducer is a semiconductor device which detects the magnetic field in its vicinity and produces an output voltage which is related to the strength of that magnetic field. The base 50 is generally circular and has a downwardly extending lip 58. Lip 58 is internally threaded to accept the externally threaded open upper portion 62 of a bowl 60. Bowl 60 is preferably of a transparent material such as glass or plastic, although an opaque material can be used. A filter (not shown) can be located within the bowl 60 to trap any extraneous particles in the fluid.

A downwardly extending generally cylindrical support 68 is formed on the interior of the base. The vertically oriented cylinder 19 is located within support 68 and its upper edge is attached to the lower surface of the base 50. The cylinder 19 has a transverse annular wall 20a at its lower end. The radially outer edge of the wall 20a is attached to the radially inner surface of the support 68. The wall 20a extends radially inwardly for a distance to direct the fluid flow path into the cylinder 19. The piston 34 is located within the cylinder 19. As before, the piston 34 is of a magnetic material and is magnetized along its length so that as the piston 34 moves up and down in the cylinder 19, the lines of magnetic force are generally normal to the plane of the Hall effect transducer 54. Thus, the position of piston 34 determines the output voltage from the Hall effect transducer 54.

The inlet 14 and outlet 16 are passages provided in the base 50 by drilling or by any other suitable method. An opening 72 is formed at the top of the cylinder 19 and communicates with outlet 16 to provide an outlet for the fluid that leaks between the piston 34 and the cylinder 19. The outlet 72 also serves as a shock absorber to smooth out the motion of the piston 34 and prevent it from bouncing. In this regard, opening 72 is analagous to and performs the same functions as the opening 26 in the previously described embodiment. A safety check valve 74 is provided on the lower surface of base 50 and communicates between the interior of the bowl 60 and the outlet 16. Valve 74 includes a closure member 76 which is biased by a spring 78. The body of check valve 74 is integrally formed with base 50, extends downwardly therefrom, and has a lower opening 82 (which opens into the interior of bowl 60) and an upper opening 84 (which opens into outlet 16). Spring 78 is compressed between a flange which surrounds upper opening 84 and the closure member 76, and urges closure member 76 against a flange which surrounds lower opening 82. Valve 74 opens if the pressure $P_1$ within the bowl 60 substantially exceeds the pressure $P_2$ in the outlet 16, and is closed otherwise.

During operation, fluid enters through the inlet 14 and passes into the bottom end of the cylinder 19 through the opening bounded by the wall 20a. The fluid passes through the slot 28, raising and lowering the piston 34 as fluid flow changes. The fluid passes out the slot 28 (and through the space between the cylinder 19 and the support 68) and then passes out of the meter 10 through the outlet 16. The rate of fluid flow determines the extent to which the piston 34 is raised and lowered. The strength of the magnetic field from the piston 34 is measured at the Hall effect transducer 54. This field strength depends upon the position of the piston 34, and varies the voltage output from the Hall effect transducer 54.

If the output voltage from Hall effect transducer 54 is non-linear, it can be shaped by a suitable electronic circuit, for example an operational amplifier (not shown), connected to it. The electronics also can include an analog-to-digital converter if the output from the Hall effect transducer 54 is to be processed in digital form. Suitable signal processing circuiting can be used to generate offset signals and the like and to correct for, e.g., fluid leakage through opening 72.

The range of the flow meter can be extended by using a heavier spring 38 and thereby increasing the fluid pressure necessary to displace piston 34. Alternatively, slot 28 can be widened, decreasing the pressure drop caused by slot 28 and bringing about the same results.

Figure 6:
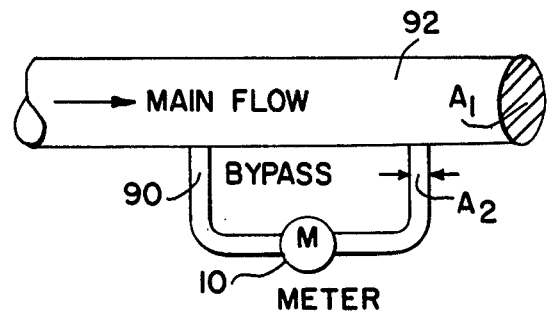
FIG. 6 is a schematic diagram of the invention connected in a manner that increases its range.

The invention can also be connected as shown in FIG. 6. If a bypass line 90 having a cross-sectional area $A_2$ is connected to and from a main line 92 having a cross-sectional area $A_1$, the ratio of fluid flow in the main line 92 to the fluid flow in the bypass line 90 will be $A_1/A_2$. Thus, if the meter 10 is placed in the bypass line 90, the flow so measured can be upscaled appropriately, enabling the flow in main line 92 to be derived.

What is claimed is:

1. A fluid flow meter comprising:
    a housing;
    a hollow cylinder within said housing said cylinder having a slot therein;
    a piston located within said cylinder, said piston having magnetic properties;
    inlet means for conveying a fluid having a flow to be measured into said housing to one end of said cylinder, the fluid moving the piston within said cylinder independent of gravity and spatial orientation to locations related to its flow and exiting through the slot;
    outlet means for conveying fluid exiting from the slot out of the housing; and
    a Hall effect transducer fixed in a position for producing an electrical signal corresponding to the position of the moving piston in said cylinder.

2. A fluid flow meter as in claim 1 wherein said housing comprises a base, said cylinder being mounted to one face of said base and said Hall effect transducer being located on another face of said base opposite to said one face.

3. A fluid flow meter as in claim 2 wherein said housing further comprises a receptacle mounted to said base, said inlet means including a portion of said receptacle for conveying the fluid to said one end of said cylinder.

4. A fluid flow meter as in claim 3 wherein said inlet means further comprises a passage formed in said base which communicates with the interior of said receptacle.

5. A fluid flow meter as in claim 4 wherein said outlet means comprises a tubular member surrounding said cylinder, said cylinder and said tubular member being sealed at said one end of said cylinder and bounding a volume between said cylinder and said tubular member into which fluid exiting from said slot flows.

6. A fluid flow meter as in claim 5 wherein said outlet means further comprises a passage in said base communicating with said volume.

7. A fluid flow meter as in claim 6 further comprising a normally closed check valve on said base, the inlet of said check valve communicating with the interior of said receptacle and the check valve outlet communicating with the passage of the outlet means, said check valve including means which open when the pressure within said receptacle exceeds the pressure in said passage of said outlet by at least a predetermined amount.

8. A fluid flow meter as in claim 5 wherein said cylinder is formed with an outlet communicating with said outlet means and is located adjacent another end of the cylinder for bleeding off fluid which leaks between the piston and an inner surface of said cylinder and which damps movement of said piston.

9. A fluid flow meter as in claim 1 wherein said cylinder is formed with an outlet communicating with said outlet means and located adjacent another end thereof for bleeding off fluid which leaks between the piston and an inner surface of said cylinder and which damps movement of the piston.

10. A fluid flow meter as in claim 1 wherein the slot has a constant width.

11. A fluid flow meter as in claim 1 further comprising a spring means for exerting a force on the piston.

12. A fluid flow meter as in claim 11, wherein said spring means exerts a constant force on the piston.

13. A fluid flow meter as in claim 11, wherein said spring means exerts a force on the piston, which force increases linearly with piston displacement.

14. A fluid flow meter as in claim 11, wherein the piston has a weight and wherein said force is much larger than said weight.

15. A device for measuring fluid flow comprising:
a confined flow passage having an upstream end and a downstream end for channeling a flowing fluid along a predetermined flow path;
means for inducing a measurable differential pressure in the fluid flowing in said passage means between the upstream and downstream ends thereof, said differential pressure being a function of the fluid flow;
a magnetic piston mounted within said passage means for movement between predetermined limits in response to said differential pressure independent of gravity and spatial orientation; and
a Hall effect transducer mounted in substantially head-on relation to said magnetic piston in substantially direct alignment with the path of movement of said magnetic piston for producing an electrical signal corresponding to the position of said magnetic piston.

* * * * *